United States Patent
Baylor et al.

(10) Patent No.: US 6,175,899 B1
(45) Date of Patent: Jan. 16, 2001

(54) METHOD FOR PROVIDING VIRTUAL ATOMICITY IN MULTI PROCESSOR ENVIRONMENT HAVING ACCESS TO MULTILEVEL CACHES

(75) Inventors: Sandra Johnson Baylor, Ossining; Yarsun Hsu, Pleasantville, both of NY (US)

(73) Assignee: International Business Machines Corporation, Armonk, NY (US)

(*) Notice: Under 35 U.S.C. 154(b), the term of this patent shall be extended for 0 days.

(21) Appl. No.: 08/858,135

(22) Filed: May 19, 1997

(51) Int. Cl.[7] ............................. G06F 12/00; G06F 12/12
(52) U.S. Cl. ................. 711/144; 711/122; 711/120; 711/135; 711/154; 711/145
(58) Field of Search ...................... 711/145, 146, 711/122, 120, 121, 135, 154, 159, 144

(56) References Cited

U.S. PATENT DOCUMENTS

| | | | |
|---|---|---|---|
| 4,513,367 | * 4/1985 | Chan et al. | 711/145 |
| 4,755,930 | * 7/1988 | Wilson, Jr. et al. | 711/122 |
| 4,797,814 | * 1/1989 | Brenza | 711/3 |
| 5,025,366 | * 6/1991 | Baror | 711/128 |
| 5,214,765 | * 5/1993 | Jensen | 713/600 |
| 5,386,547 | * 1/1995 | Jouppi | 711/122 |
| 5,530,832 | * 6/1996 | So et al. | 711/122 |
| 5,572,704 | * 11/1996 | Bratt et al. | 711/161 |
| 5,574,922 | * 11/1996 | James | 395/561 |
| 5,577,227 | * 11/1996 | Finnell | 711/122 |
| 5,632,025 | * 5/1997 | Bratt et al. | 711/152 |
| 5,706,464 | * 1/1998 | Moore et al. | 711/122 |
| 5,717,890 | * 2/1998 | Ichida et al. | 711/122 |
| 5,872,980 | * 2/1999 | Derrick et al. | 395/726 |

OTHER PUBLICATIONS

Jim Handy. "The Cache Memory Handbook", Academic Press, pp. 62–90, 1993.*

Andrew S. Tanenbaum, "Modern Operating Systems" Prentice Hall, Inc., pp. 27–64, 1992.*

* cited by examiner

Primary Examiner—Eddie P. Chan
Assistant Examiner—Hong Kim
(74) Attorney, Agent, or Firm—Douglas W. Cameron; Anne Vachon Dougherty

(57) ABSTRACT

A method for assuring virtual atomic invalidation in a multilevel cache system wherein lower level cache locations store portions of a line stored at a higher level cache location. Upon receipt of an invalidation signal, the higher level cache location invalidates the line and places a HOLD bit on the invalidated line. Thereafter, the higher level cache sends invalidation signals to all lower level caches which store portions of the invalidated line. Each lower level cache invalidates its portion of the line and sets a HOLD bit on its portion of the line. The HOLD bits are reset after all line portion invalidations have been completed.

9 Claims, 3 Drawing Sheets

METHOD FOR PROVIDING VIRTUAL ATOMICITY IN MULTI PROCESSOR ENVIRONMENT HAVING ACCESS TO MULTILEVEL CACHES

FIELD OF THE INVENTION

This invention relates to multiprocessor computing systems wherein each of a plurality of processors may require access to information stored in main memory and additionally stored in multilevel cache memory locations having graduated line-size storage.

BACKGROUND OF THE INVENTION

Cache storage schemes have been developed to provide faster access to frequently required data or instructions. Information which a processor needs can be retrieved from the main memory storage location; however, such retrieval may take a long time, particularly when viewed from the perspective of the increasingly fast processors which have been and are continuously being developed. In order to reduce the number of wait states involved when accessing information from main memory, more responsive memory locations have been provided in the form of caches. Each cache is smaller than the main memory storage location and is provided to store copies of certain lines of information from the main memory. Generally, a cache will be used to store the most recently and/or most frequently accessed information in order to provide that information to the processor with minimal memory access time.

Multiple layers or levels of cache memory have been implemented between the main memory and the processor to further expand the caching capabilities of a system and to provide faster access to larger amounts of information. Typically, a higher level memory location (e.g., $L_3$) will be a large memory cache for storing some subset of the information contained in the main memory, while lower level memory locations (e.g., $L_2$) will be smaller memory caches for storing subsets of the information contained in the higher level memory locations. Until recently, the monetary expense of incorporating cache memory into computer systems prohibited widespread usage of multilevel caches, in spite of the improved time efficiency. Now, however, multilevel cache usage is widespread, and is particularly popular in multiprocessor systems and in distributed computing environments.

In multiprocessor systems, more than one processor may require access to information stored at a particular location. FIG. 1 illustrates a multiprocessor system, M, having four processors, $P_A$ through $P_D$, each associated with a lower level cache memory location, $L_{2A}$ through $L_{2D}$. Each of the lower level cache memory locations contains a subset of the information stored at the higher level cache memory location $L_3$, which in turn stores a subset of the information stored at the main memory (not shown). The multiprocessor system may additionally be connected along an interconnection network, 20, to another multiprocessor system, M', having processors $P_E$ through $P_H$ associated with lower level caches $L_{2E}$ through $L_{2H}$, which contain subsets of the information stored at the higher level cache location $L_3'$, as shown in FIG. 2, and further to any number of multiprocessor systems $M_x$ (not shown).

In distributed computing systems, it is beneficial to incorporate multilevel caches to facilitate faster access to the stored information, whether the access is from a local processor or from remote processors located elsewhere on the network. Therefore, multilevel caches are provided which can be accessed by not only one or more local processors, but also by a plurality of remote processors.

In general, in multiprocessor systems, one processor is the designated "owner" of the information stored at a particular cache location, and that owner will be responsible for updating information in the cache and for allowing other processors to update the information stored in that cache. Any update to a given cache location is ideally carried through to all other stored copies of the information, in order to assure that each location has the most recent copy of the information stored therein, providing so-called cache coherency. However, the time and bandwidth required to broadcast and globally implement every memory update can be prohibitive. Therefore, systems generally adhere to one of two basic approaches to memory updates, implementing a write through or a write back policy, or a modified combination of both.

Under a write through policy, each update to a cache location is written to the next level cache, where the resident copy of the information will be updated and sent to the next level cache, with the change ultimately propagating through to all copies of the information. As noted above, such a policy is optimal for assuring that all retrieved information is not stale; however, time and resources are tied up throughout implementation of the write through policy.

As an alternative, the write back policy provides that an update is done at the cache location, with each of the other copies of the information, including the main memory, only being updated later when access to that copy is requested by its associated processor. When the update is done to a line of data at the "owned" memory location, an invalidation signal is sent out on the bus indicating that the line is being modified. Each cache location which has a copy of that line must then invalidate its resident copy of the line. Upon a subsequent attempt to access that line of data, the requesting processor learns that the line has been invalidated. The requesting processor must issue a request for the updated data from the owner, and only then will the line of data at the "non-owned" cache location be updated.

In bus-based systems, cache locations learn of an update or an invalidation by monitoring or "snooping" for any write requests or invalidation signals that involve information stored at that location. The write request will be issued by the owner of the information, and will identify that information which is to be updated. Invalidation signals will identify the line of information which has been updated. Therefore, the snooping location simply looks for write packets or invalidation signals which include any identifiers matching its stored information.

A problem that arises when operating under a write back policy in a multiprocessor environment is that different storage locations may have different copies of the stored information. Since one processor can be accessing a lower level cache, for example $P_A$ accessing information from $L_{2A}$, at the same time as another processor is accessing the "same" information from a higher level cache, $P_E$ accessing information from $L_3$, each may be receiving a different version of the stored information. The foregoing is particularly a concern when the request for access to the information is received at a cache location after the write to the owned location but before the invalidation signal has been received at the cache-location.

The invalidation process becomes even more problematic when the granularity of sharing between levels is altered. For example, there may be a difference in the line sizes between memory locations as different levels, so that one line of information from location $L_3$ will be broken up for storage at the lower level locations, $L_2$, with different portions of that line being stored at four different cache locations in level $L_2$. With reference to FIG. 2, assume that a line of information stored at $L_3$ has components of that line stored at each of locations $L_{2A}$ through $L_{2D}$. Other lines of information from $L_3$ may be stored in fewer than the four locations, depending upon the line size in the $L_2$ caches and depending upon the amount of information in the line from $L_3$. If the line of information stored at $L_3$ is owned by a processor in M', and that processor issues an update for the line, $L_3$ will put an invalidation signal on the $L_2$ bus so that all cache locations storing any portions of the line will be invalidated. Since four separate invalidation signals must be sent, and $L_3$ may have to wait for access to the $L_2$ bus, it is possible that $P_A$, $P_B$, $P_C$ or $P_D$ may attempt to read that line from its associated cache in the interim between $L_3$ being updated and $L_3$successfully completing transmission of all four of the invalidation signals. Therefore, the requesting processor may be receiving stale (i.e., non-updated) information.

Hence, it is an objective of the present invention to provide a method for propagating invalidation signals from a higher level cache, to lower level caches having smaller line sizes than the higher level cache, without risking incoherency in the process.

SUMMARY OF THE INVENTION

The foregoing and other objectives are realized in the present invention whereby, upon receipt of an invalidation signal, the higher level cache location invalidates the line and places a HOLD bit on the invalidated line. Thereafter, the higher level cache sends invalidation signals to all lower level caches which store portions of the invalidated line. Each lower level cache invalidates its portion of the line and sets a HOLD bit on its portion of the line. The HOLD bits are reset after all line portion invalidations have been completed.

BRIEF DESCRIPTION OF THE DRAWINGS

The invention will now be described with specific reference to the attached figures wherein.

DESCRIPTION OF THE PREFERRED EMBODIMENT

The present invention is incorporated into a multilevel cache system wherein the line sizes for the storage locations at the lower level are smaller than the line size of the storage location at the next highest level. While it is not necessary, it has been observed that the most practical implementation of graduated line-size storage is to provide that the higher level line size be a multiple of the lower level line size. In such a hierarchical storage arrangement, the problem of cache coherency is exacerbated, as discussed above. Therefore, the present invention is a method for providing virtual atomic invalidation, such that the generation of invalidation signals to multiple lower level storage locations has the effect of a single invalidation with respect to access to the information to be invalidated.

Figure 1:
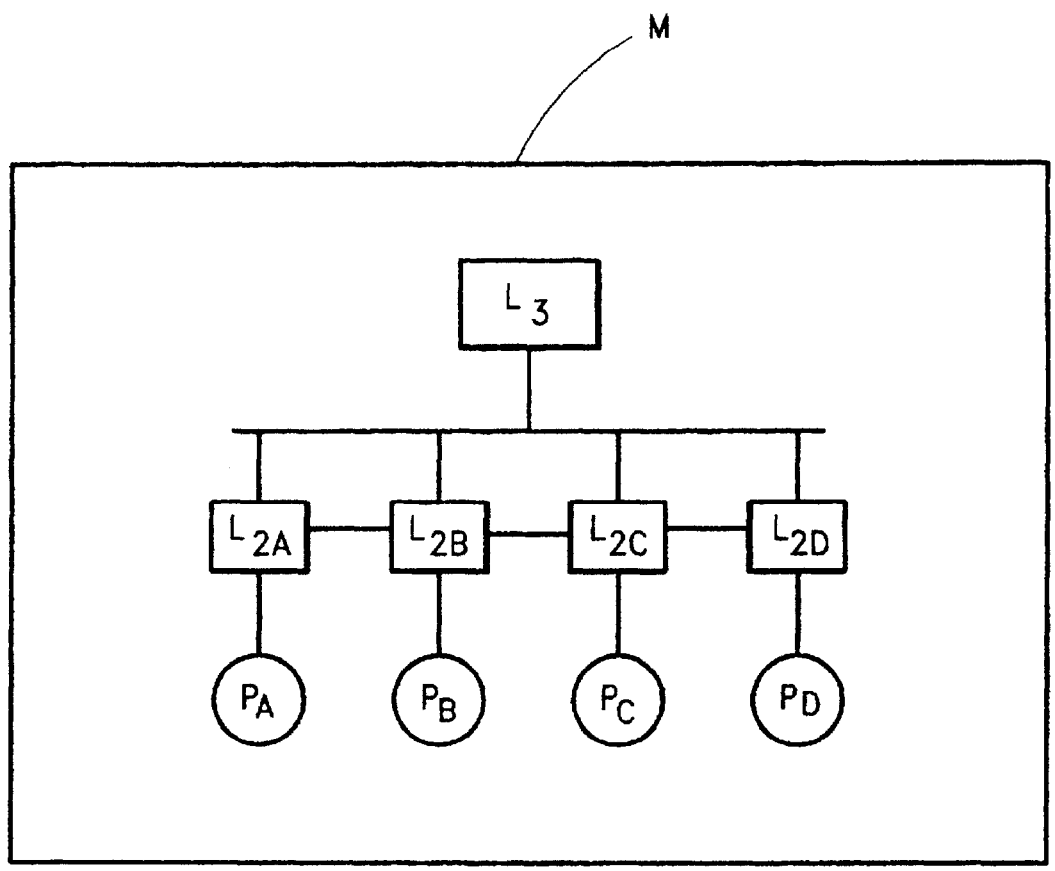
FIG. 1 provides an illustration of a multiprocessor system having multilevel cache storage.
Figure 2:
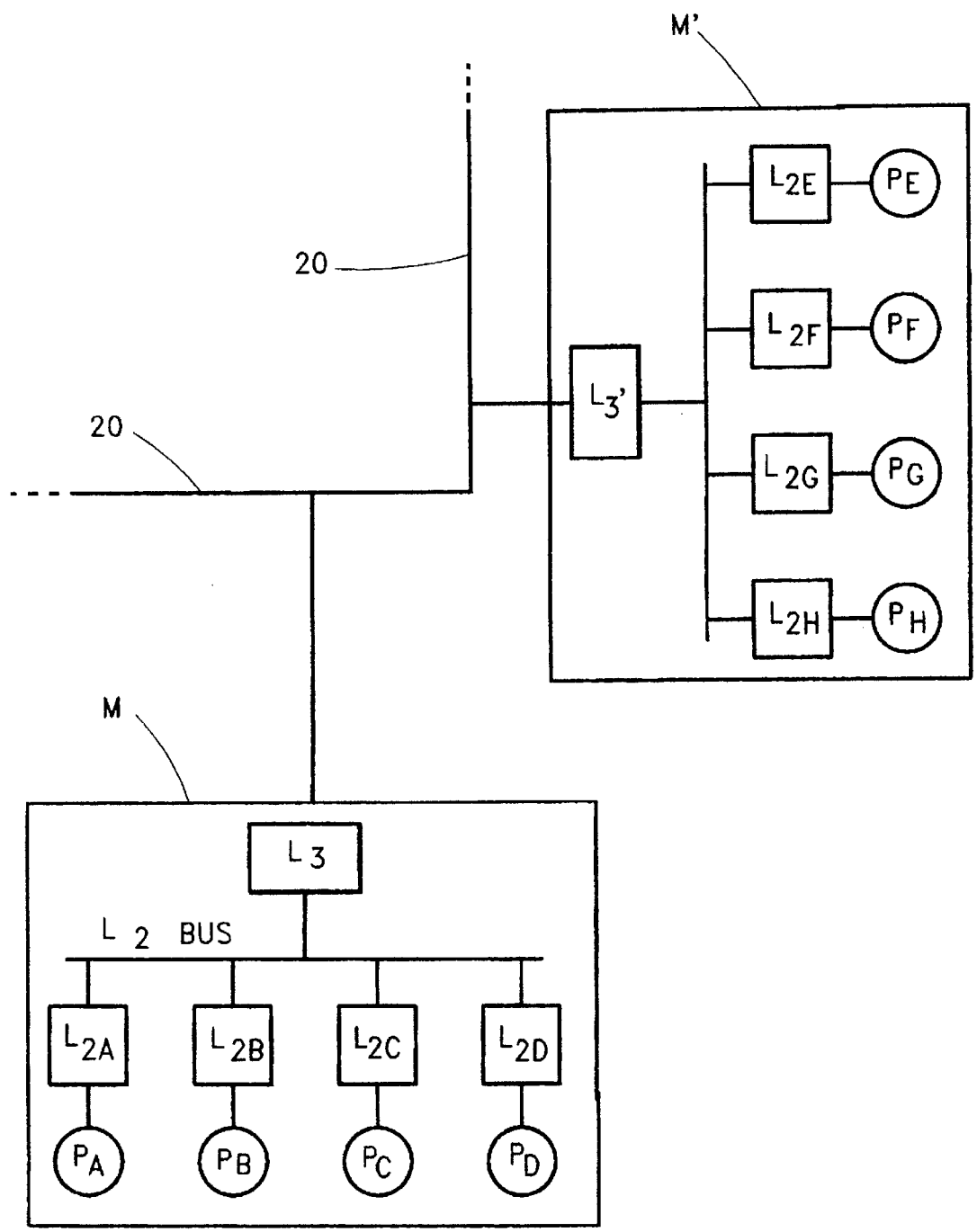
FIG. 2 provides an illustration of a distributed computer network having multilevel cache storage.
Figure 3:
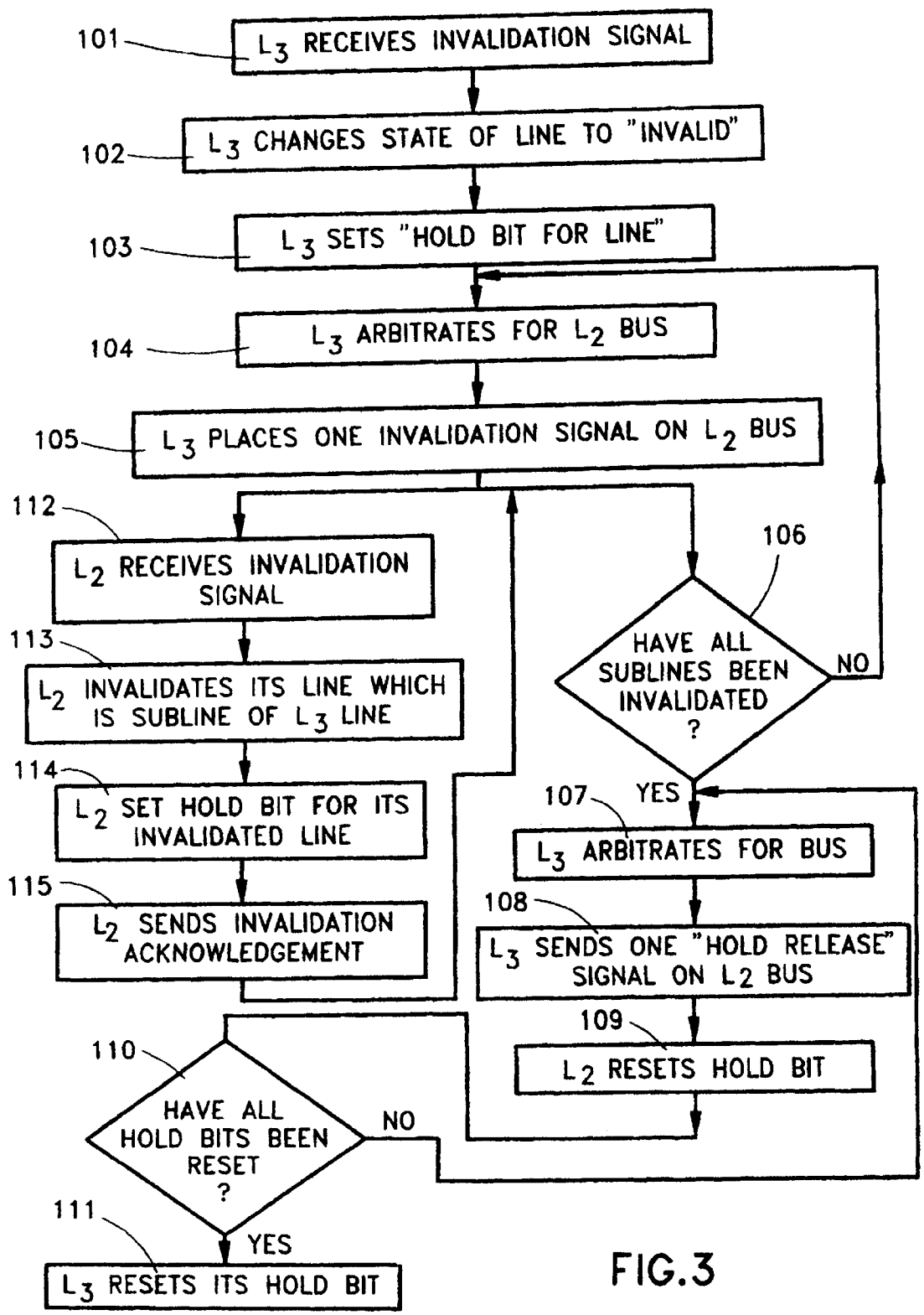
FIG. 3 is a representative process flow for implementation of the present invention.

FIG. 3 provides a process flow for implementation of the present invention. The process flow refers to the cache locations depicted in multiprocessor system $M_1$ of FIG. 2. When the higher level cache location, $L_3$, receives an invalidation signal for a line of stored information, at box 101 of FIG. 3, it first changes the state of the indicated line of information to "INVALID", at box 102. Next, $L_3$ sets a "HOLD" bit for the line of information, at 103, such that access to the line will be prevented until the invalidation process has been completed. An exception to the "HOLD" status of the line will be made if a write back operation is to be performed to provide a modified version of the information to that higher level cache line. The order of steps 102 and 103 can be reversed, or the two steps performed simultaneously, without adversely impacting the inventive method.

Once the line has been invalidated and the "HOLD" bit set for the higher level cache line, the higher level cache $L_3$ attempts to gain access to the $L_2$ bus, at 104. Once the higher level cache wins arbitration for the $L_2$ bus, it places an invalidation signal on the bus for one of the lower level cache lines which compose the higher level cache line, at 105. The process of arbitration for the bus and sending invalidation signals continues until all of the necessary invalidation signals have been sent along bus $L_2$. As mentioned above, the information in the higher level cache line may be stored in two or more of the lower level cache locations. $L_3$ must send the same number of invalidation signals as there are cache locations having sublines of that higher level cache line which is to be invalidated.

The higher level cache must determine, at 106, whether all necessary invalidations have taken place before the process flow continues. The determination in decision box 106 may be made in one of two ways. The policy may be implemented that $L_3$ must receive an acknowledgement from each of the necessary $L_2$ locations which store a portion of the invalidated line that the invalidation signal has been received and that the relevant line has been invalidated (shown as optional step 115). In the alternative, it may be sufficient for $L_3$ simply to verify that all of the necessary invalidation signals have been placed on the $L_2$ bus prior to proceeding.

While the higher level cache is arbitrating for the bus and placing any remaining invalidation signals on the bus, any lower level cache which has received the invalidation signal, at 112, proceeds to invalidate the line which is a subline of the $L_3$ line, at 113. The lower level cache, $L_2$, optionally sets a "HOLD" bit for that invalidated line at step 114. It is to be noted that steps 113 and 114 may be reversed or conducted simultaneously, as with steps 102 and 103 above. One can implement the invention without including the optional step 114 of setting a "HOLD" bit at $L_2$; however, if the step is omitted, it is advisable that the alternative step be adopted that $L_3$ responds to any requests along the $L_2$ bus for the duration of the time that the $L_3$ "HOLD" bit is set. If one of the two options is not implemented, the situation could arise that an $L_2$ location will, once its line has been invalidated, put a request on the $L_2$ bus requesting data. Should another $L_2$ location respond to the request before the responding $L_2$ location has itself received the invalidation signal, then old data will be provided to the requesting $L_2$.

Optional step 115 has the lower level cache acknowledging that the invalidation has been completed at its location. The optional acknowledgement step is not preferred since it would require arbitrating for the bus and tying up the bus while sending the acknowledgement, all of which would degrade the overall system performance. Therefore, it is preferable that $L_3$ "assume" that all invalidations have been completed once all of the necessary invalidation signals have been placed on the bus.

Once all invalidations have been verified, either explicitly or by assumption, the higher level cache sends HOLD RELEASE signals to all of the lower level caches. As shown in steps 107 and 108, the higher level cache must once again wait for the bus and send a plurality of HOLD RELEASE signals, equal to the number of lower level locations which contain a portion of the invalidated $L_3$ line. When each $L_2$ location receives the HOLD RELEASE signal, it resets its HOLD bit at 109. Once all of the HOLD bits at each $L_2$ location have been reset, as determined at 110, $L_3$ resets its HOLD bit at 111 and the process is complete. As with the determination at step 106, the determination at 110 of whether all HOLD bits have been reset may be explicit (whereby all $L_2$ locations send a signal indicating compliance) or assumed (once all of the HOLD RELEASE signals have been placed on the bus).

The methodology described above results in virtual atomic invalidation. While the invalidation process is occurring, a processor can access the lower level cache lines that have yet to be invalidated or which do not store part of the line which is being invalidated. The invention has been described with reference to several specific embodiments. One having skill in the relevant art will recognize that modifications may be made without departing from the spirit and scope of the invention as set forth in the appended claims.

What is claimed is:

1. A method for providing virtual atomicity in a multi-level cache system having a plurality of higher and lower level cache storage locations, wherein portions of each line of data stored in a higher level cache location are additionally stored as lines in a plurality of lower level cache locations, comprising the steps of:

invalidating said line of data at said higher level cache location; and issuing a plurality of invalidation signals from said higher, level cache location, including issuing a first invalidation signal for a first portion of said line of data to a lower level cache location storing a copy of that first portion of said line of data; and issuing at least one additional invalidation signal to each additional one of said plurality of lower level cache locations storing an additional portion of said line of data;

each of said plurality of lower level cache locations invalidating its portion of said line of data and setting a hold bit for said invalidated portion of said line of data;

each of said plurality of lower level cache locations sending an acknowledgement signal to said higher level cache locaiton after invalidating said portion of said line of data;

receiving a plurality of acknowledgement signals at said higher level cache location, one from each of said lower level cache locations;

sending a plurality of hold release signals from said higher level cache location upon receipt of said acknowledgement signals; and wherein each of said lower level cache locations resets its hold bit upon receipt of one of said plurality of hold release signals.

2. The method of claim 1 wherein said higher level further sets a higher level hold bit for said invalidated line of data.

3. The method of claim 2 further comprising releasing said higher level hold bit after issuing said plurality of invalidation signals.

4. The method of claim 1 wherein each of said lower level cache locations further sets a hold bit for said invalidated portion of said line of data.

5. The method of claim 1 wherein said lower level cache locations are connected along a lower level cache bus and wherein said higher level cache location requests access to said bus prior to sending each of said plurality of invalidation signals.

6. The method of claim 1 wherein said lower level cache locations are connected along a lower level cache bus and wherein said higher level cache location requests access to said bus prior to sending each of said plurality of hold release signals.

7. The method of claim 1 wherein said lower level cache locations are connected along a lower level cache bus and wherein said higher level cache location responds to all requests on said bus while issuing said plurality of invalidation signals.

8. A method for providing virtual atomicity in a multi-level cache system having a plurality of higher and lower level cache storage locations, wherein portions of each line of data stored in a higher level cache location are additionally stored as lines in a plurality of lower level cache locations, comprising the steps of:

invalidating said line of data at said higher level cache location;

setting a higher level hold bit for said invalidated line of data;

issuing a plurality of invalidation signals from said higher level cache location, including issuing a first invalidation signal for a first portion of said line of data to a lower level cache location storing a copy of that first portion of said line of data; and issuing at least one additional invalidation signal to each additional one of said plurality of lower level cache locations storing an additional portion of said line of data;

each of said plurality of lower level cache locations invalidating its portion of said line of data;

each of said plurality of lower level cache locations sending an acknowledgement signal to said higher level cache locaiton after invalidating said portion of said line of data;

receiving a plurality of acknowledgement signals at said higher level cache location, one from each of said lower level cache locations; and further comprising releasing said higher level hold bit after receiving said acknowledgement signals.

9. A multilevel cache system for storage of lines of computer data comprising:

at least one higher level cache storage location for storing at least one line of data; and a plurality of lower level cache storage locations, wherein portions of said at least one line of data stored in a higher level cache location are additionally stored as lines in a plurality of lower level cache locations, and wherein said higher level cache storage location further comprises receiving means for receiving an invalidation signal for said at least one line of data and for receiving a plurality of acknowledgement signals at said hither level cache location, one from each of said lower level cache locations; invalidating means to invalidate said line of data at said higher level cache location, communication means to issue a plurality of invalidation signals from said higher level cache location to said plurality of lower level cache locations, one signal for each lower level cache location storing a portion of said line of data, including issuing a first invalidation signal for a first portion of said line of data to a lower level cache location storing a copy of that first portion of said line of data and issuing at least one additional invalidation signal to each additional one of said plurality of lower level cache locations storing an additional portion of said line of data, and hold bit means for setting a hold bit upon invalidation and for releasing said hold bit upon receipt of said acknowledgement signals from the lower level caches; and wherein each of said plurality of lower level cache locations includes invalidation means for invalidating its portion of said line of data, bit setting means for setting a hold bit for said invalidated portion of said line of data; communication means for sending an acknowledgement signal to said higher level cache location after invalidating said portion of said line of data; and wherein each of said lower level cache locations resets its hold bit upon receipt of one of said plurality of hold release signals.

* * * * *